United States Patent [19]
Anthony

[11] Patent Number: 5,394,703
[45] Date of Patent: Mar. 7, 1995

[54] SELF-CHILLING FOOD OR BEVERAGE CONTAINER

[75] Inventor: Michael Anthony, Boca Raton, Fla.

[73] Assignee: Microcold Technologies, Inc., Boca Raton, Fla.

[21] Appl. No.: 164,204

[22] Filed: Dec. 9, 1993

Related U.S. Application Data

[63] Continuation-in-part of Ser. No. 69,985, May 28, 1993, Pat. No. 5,331,817.

[51] Int. Cl.6 ............................ F25D 3/10; F25B 9/04
[52] U.S. Cl. ........................................ 62/5; 62/294; 62/371
[58] Field of Search ................... 62/293, 294, 371, 5

[56] References Cited

U.S. PATENT DOCUMENTS

| | | | |
|---|---|---|---|
| 3,074,243 | 1/1963 | Tilden | 62/5 |
| 3,144,754 | 8/1964 | Tilden | 62/5 |
| 3,309,890 | 3/1967 | Barnett et al. | 62/457.9 |
| 3,494,141 | 2/1970 | Irwin et al. | 62/457.9 |
| 3,494,142 | 2/1970 | Beck | 62/457.9 |
| 3,525,236 | 8/1970 | Solhkhah | 62/294 |
| 3,636,726 | 1/1972 | Rosenfeld | 62/294 |
| 3,654,768 | 4/1972 | Inglis et al. | 62/5 |
| 3,786,643 | 1/1974 | Anderson et al. | 62/5 |
| 3,919,856 | 11/1975 | Beck | 62/457.9 |
| 4,640,102 | 2/1987 | Tenenbaum et al. | 62/294 |
| 4,656,838 | 4/1987 | Shen | 62/294 |
| 4,679,407 | 7/1987 | Kim et al. | 62/457.9 |
| 4,688,395 | 8/1987 | Holcomb | 62/457.9 |
| 4,736,599 | 4/1988 | Siegel | 62/294 |
| 4,941,328 | 7/1990 | Sheu | 62/294 |
| 5,010,736 | 4/1991 | York et al. | 62/5 |
| 5,201,183 | 4/1993 | Ramos | 62/4 |

*Primary Examiner*—William E. Tapolcai
*Attorney, Agent, or Firm*—Thompson, Hine and Flory

[57] ABSTRACT

A portable, self contained heating or cooling apparatus for a beverage can is disclosed. A vortex tube is provides which supplies the needed heating or cooling effect to the beverage in the can.

9 Claims, 3 Drawing Sheets

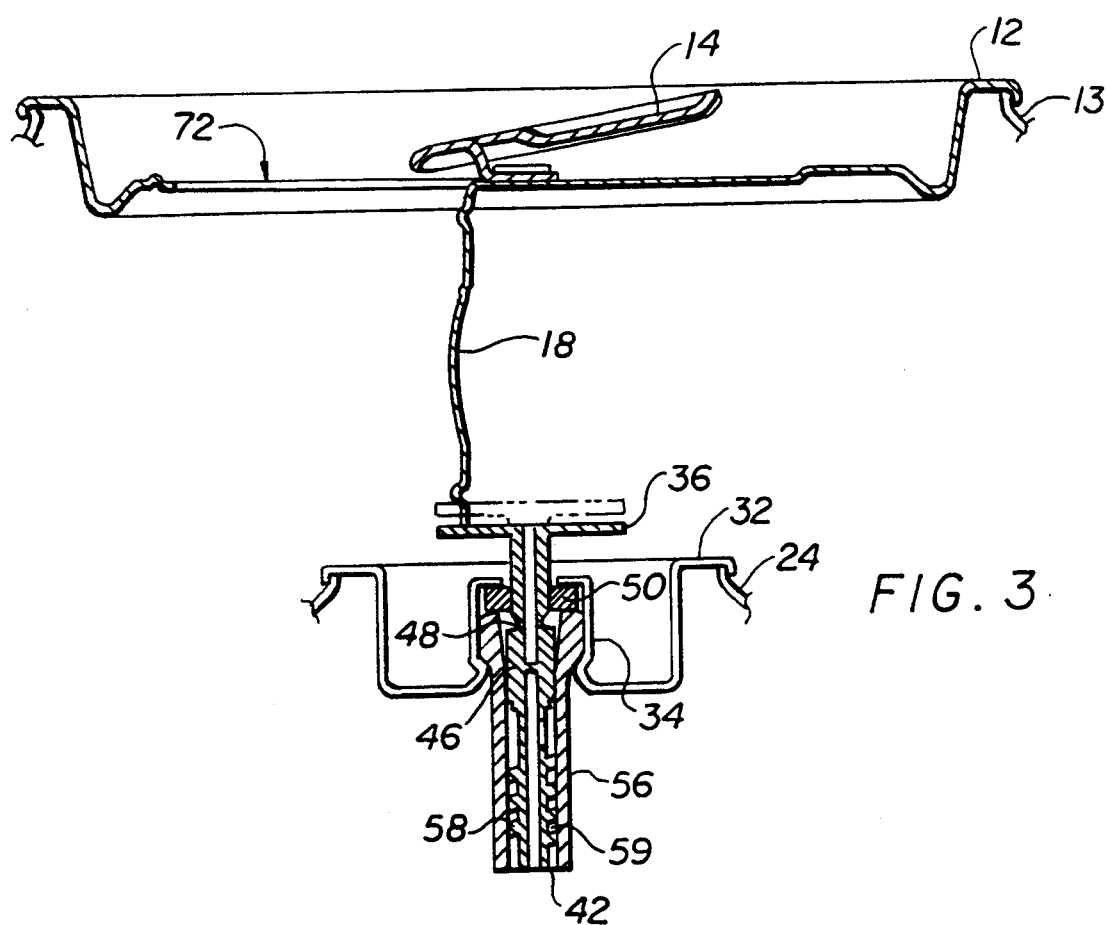
FIG. 3
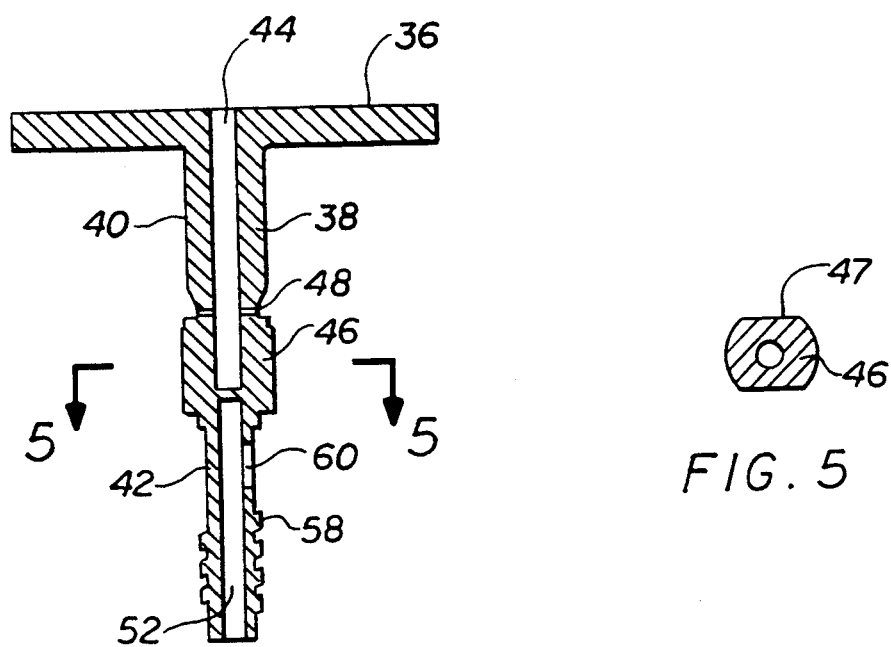
FIG. 4
FIG. 5

SELF-CHILLING FOOD OR BEVERAGE CONTAINER

CROSS-REFERENCE TO RELATED APPLICATIONS

This application is a continuation-in-part of U.S. application Ser. No. 08/069,985, filed May 28, 1993, now U.S. Pat. No. 5,331,817.

FIELD OF THE INVENTION

This invention relates to a self-chilling container for a food or beverage of the type containing a compressed or refrigerant. More particularly, it relates to a 5457 self-chilling container in which a refrigerant expands and flows rapidly through a vortex tube whereupon a portion of the refrigerant is chilled and returned to the refrigerant reservoir where it effects further cooling of the food or beverage.

For a discussion of vortex tubes and their previous use in cooling systems, reference can be made to U.S. Pat. Nos. 3,074,243 and 3,144,754 to Tilden and to applicant's copending application Ser. No. 08/069,945 of May 28, 1993.

SUMMARY OF THE INVENTION

It is an object of this invention to provide a simple, safe and effective device that can be housed within a beverage or food container for the purpose of cooling the contained food or beverage on demand.

More particularly, it is an object of the invention to provide a heat exchange unit which can be manufactured independently of the food or beverage container and simply dropped into the food or beverage container on the bottling or packaging line and activated when the food or beverage container is opened in the usual manner, e.g., by lifting the tab in a pop-top container without the need to make any mechanical linkages between the unit and the container.

One manifestation of the invention is a container for a food or beverage comprising:
- a vessel for containing the food or beverage and a heat exchange unit containing a pressurized refrigerant;
- the vessel including a lid, the lid having a score line therein defining a tear panel and a pull ring affixed to the panel such that upon lifting the pull ring, the score line is ruptured, the tear panel is bent into the vessel, and an opening is opened in the lid;
- the heat exchange unit and including a valve member for releasing the refrigerant therefrom and an actuator for opening the valve member;
- the heat exchange unit being housed within the vessel and being operatively positioned within the vessel with respect to the tear panel such that the actuator is contacted by the tear panel and the refrigerant is released from the heat exchange unit when the lid is opened.

Another manifestation of the invention is the aforementioned heat exchange unit.

BRIEF DESCRIPTION OF THE DRAWINGS

FIG. 3 is a cross-sectional schematic illustration of the container and valve means of FIG. 1 in its opened condition.

FIG. 4 is a perspective view of the valve stem and vortex tube used in one embodiment of the invention.

FIG. 5 is a cross-section of the valve stem of FIG. 4 along the line 5—5.

DETAILED DESCRIPTION OF A PREFERRED EMBODIMENT

Figure 1:
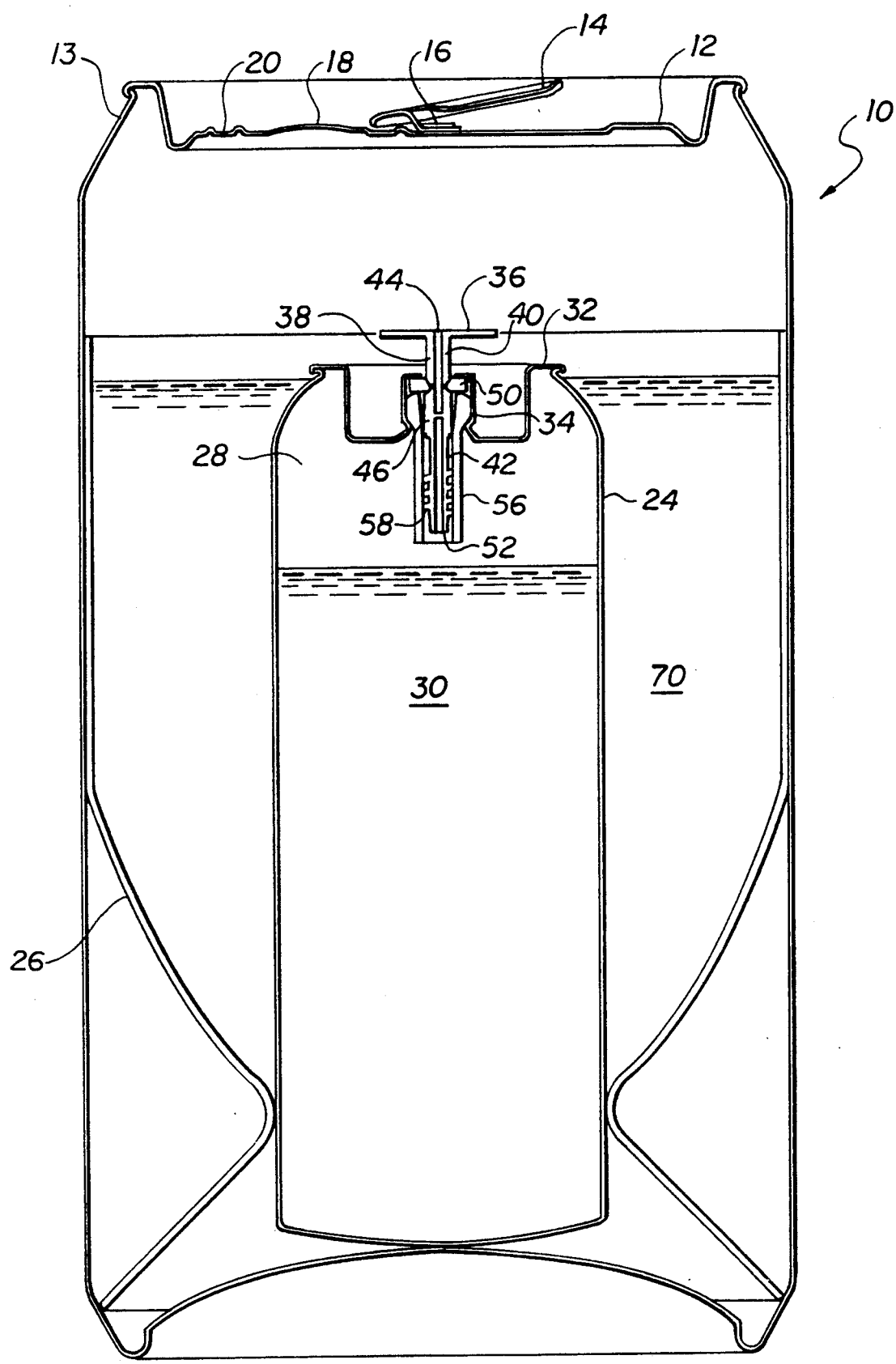
FIG. 1 is a cross-sectional schematic illustration of a self-chilling beverage can with heat exchange unit in accordance with one embodiment of the invention with the valve closed.

FIG. 1 illustrates a beverage can of the type that can be used to contain beverages in accordance with the invention. The can 10 includes a lid 12 which is crimped to the can body 13 about its periphery. The lid includes a conventional tab or pull ring 14 which is secured by a rivet 16 to a tear panel 18. The tear panel 18 is defined by a score line 20 such that when the tab 14 is lifted, the score line 20 is broken and the tear panel 18 is bent into the can 10. The operation of the tab in breaking the score line and bending the tear panel into the can is well known in art.

In accordance with the invention, a heat exchange unit (HEU) 24 is provided which is structurally independent of the can 10 with the exception that a positioning means or retaining element 26 is provided around the HEU 24 to lock the unit in position after it is inserted into the can. The retaining element 26 may be made from a wide range of materials and assume any of a variety of designs provided the retaining element 26 maintains the unit's position with respect to the tear panel 18 such that (a) the HEU is not activated until the tear panel is opened and (b) when the tear panel is opened, the panel acts on the HEU as described herein. The retainer 26 can be formed of a metal or plastic material which has elastic or spring-like properties such that the unit can be compressed or deformed and inserted into the container whereafter it springs open and holds the HEU in position therein. One important advantage of the heat exchange unit 24 is that it can be dropped into the container 10 on the beverage filling line without the need for making any other mechanical connections or linkages with the container.

The HEU 24 includes a canister 28 which contains a refrigerant 30, which is preferably liquid, and is enclosed by a lid 32 including a hub 34 in which a valve member is retained. In the embodiment illustrated in FIG. 1, the HEU is provided with an actuator plate 36 which is carried on stem 38. Hereinafter, the stem 38 will be described with reference to a first portion 40, which is the upper portion of the stem as shown in FIG. 1 and a second portion 42 which is the lower portion of the stem. As will become apparent from the following discussion, an operable HEU can be obtained using the first portion 40 of the stem while eliminating the second portion 42 although the second portion 42 of the stem, including the vortex tube, represents the most preferred embodiment of the invention.

The first or upper portion 40 of stem 38 has an axial passageway 44 which extends from stem portion 40 through the actuator plate 36. The passageway 44 is closed at the junction 46 of stem portion 40 and stem portion 42 as shown in FIG. 4. Junction 46 includes flats 47 as shown in FIG. 5 to permit gaseous refrigerant to flow around the outer surface of the junction and into openings 48 when the HEU is activated as described later.

A plurality of radial openings 48 is provided in the stem portion 40 which extend from the outside surface of stem 38 and open on the axial passageway 44 thereby establishing a fluid path for the refrigerant to be released from the canister 28 through openings 48 and passageway 44. In FIG. 1, the HEU 24 is shown in its closed condition. In this condition, the openings 48 are blocked by an elastomeric ring or gasket 50 which surrounds the stem 38. When the second or lower portion of the stem 42 is not used the ring 50 is retained in a hub 34 by a radial flange (not shown).

In the embodiment shown in FIG. 1, the stem 38 includes stem portion 42 which has a tubular construction and includes axial passageway 52 as best seen in FIG. 4 which opens at its distal end on the refrigerant 30 in the canister 28. Stem portion 42 is housed within a tubular member 56 which is retained in hub 34 by flange 35. Stem portion 42 carries helical ridges or flights 58 on its outer surface. A helical space 59 is formed between the ridges 58 and the inside surface of tubular member 56. A radial opening 60 is provided above the ridges 58 through which refrigerant can enter the passageway 52 and be recycled to canister 28 as described below.

The can 10 and HEU 24 operate as follows: When the valve member is closed, i.e., when the elastomeric ring 50 covers the openings 48 in stem portion 40, the canister 28 is sealed and gas, i.e., evaporated refrigerant cannot release from the HEU. When tab 14 is lifted, the tear panel 18 is bent into the can 10. This bending action is the same action which the tab 14 produces in a conventional pop top can. In accordance with the invention, as tear panel 18 bends inwardly, it contacts the actuator plate 36 and causes the stem 38 to move relative to the elastomeric ring 50, for example, the stem 38 is moved downwardly by the tear panel 18 as shown in FIG. 3. Valve designs are also possible wherein the tear panel causes lateral displacement of the stem in gasket 50 which allows gas to flow.

When stem 38 is moved down, the openings 48 are no longer blocked by the ring 50 and fluid communication is established between the refrigerant in canister 28 and axial passageway 44 in stem 38. In the simplest embodiment of the invention, i.e., without the vortex element, downward movement of stem 38 releases the pressure in canister 28 and allows the refrigerant to expand and evaporate and evaporative cooling occurs in the HEU. The HEU absorbs heat from the beverage 70 through the walls of canister 28 which is preferably formed from a heat conductor like aluminum. The gasified refrigerant flows through passageway 44 and is ultimately exhausted from the can 10 through the opening 72 produced by the tear panel in the lid 12.

In a preferred embodiment of the invention, gaseous refrigerant flows into the helical space 59 between the ridges 58 and the tubular member 56. As the refrigerant flows into this space at a high velocity, a vortex is formed and the vortex cooling phenomenon occurs. The gas on the outside of the vortex moving along the inside wall of the tubular member 56 increases in temperature while the gas at the center of the vortex decreases in temperature. For a more detailed explanation of vortex cooling, reference can be made to the applicant's copending application as well as to numerous literature references.

In accordance with the preferred embodiment of the invention, the higher temperature gas along the inside wall of the tubular member 56 moves upwardly around the junction 46, which may be formed with flats 47, to permit egress of the gas, into openings 48 and is released from the HEU through passageway 44 and the opening 72 in lid 12. The cooled gas at the center of the vortex is forced by back pressure to enter radial opening 60 and moves downwardly into canister 28 where it is recirculated to continue cooling the HEU 24.

In accordance with one embodiment of the invention, depending upon the nature of the refrigerant which is selected and the pressures used, the gas at the center of the vortex can be cooled to the point at which the refrigerant actually condenses and drips back into canister 28 from the distal end of stem portion 42.

Figure 2:
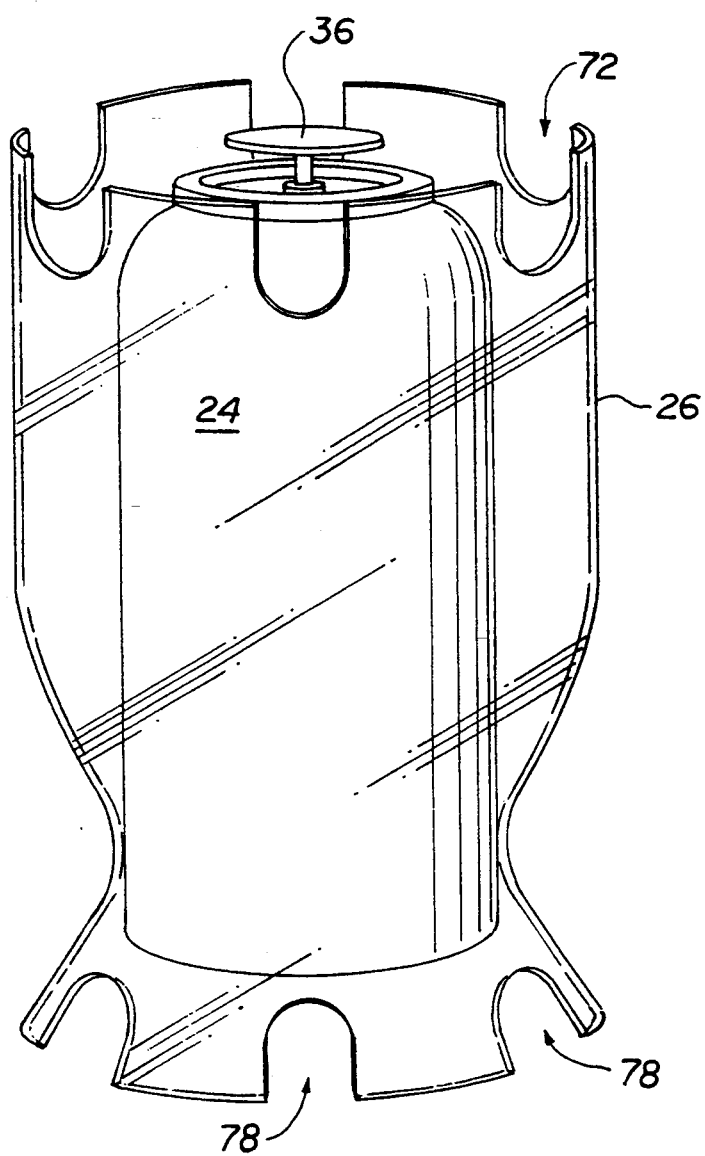
FIG. 2 is a perspective view of the heat exchange unit and its associated positioning member.

FIG. 2 is a perspective view of the HEU 24 and the positioning element 26. As explained previously, positioning element 26 is formed from a spring-like or elastomeric material so that the element can be deformed to insert the HEU and the element through the neck 76 of the can 10. Unlike the neck shown in FIG. 1, to conserve materials and reduce material costs, industry is frequently using smaller diameter lids in conjunction with cans having narrower necks. Accordingly, the retaining element 26 must be designed such that it can be inserted into these narrower necked cans and it springs open inside the can to hold the HEU in place. It should be apparent form the foregoing discussion that the retaining unit must prevent the actuator plate 36 from contacting the lid 12 before the can is opened when the can is stored upside down, on its side, or the can is shaken.

In addition to being designed to retain the position of the HEU in the can, the retaining element 26 is also designed to permit the beverage to flow under the thermal flux produced in the can upon activating the HEU. The retaining element 26 includes cut outs 78, 79 and is fluted for this purpose. In this manner, cooled beverage adjacent the base of the HEU 24 can flow from cut outs 78 and warmer beverage can circulate into contact with the HEU through cut outs 79. Element 26 is fluted radially such that beverage can circulate between the HEU and the element 26 between the flutes in element 26.

A variety of refrigerants can be used in the HEU including isobutane, propane, carbon dioxide, CFC's, HCFC's, etc. A currently preferred refrigerant is a mixture of isobutane and carbon dioxide or a mixture of isobutane, propane and carbon dioxide. Typical pressures may range from 200-300 psi.

The size of the HEU and the amount of refrigerant will depend on the nature of the refrigerant, the pressure in the HEU, and the size of the can with which the HEU is used.

Having described the invention in detail and by reference to preferred embodiments thereof, it will be apparent that modifications and variations are possible without departing from the scope of the invention defined in the appended claims.

What is claimed is:

1. A container for a food or beverage comprising:
   a first vessel for containing the food or beverage, and a heat exchange unit including a second vessel containing a pressurized refrigerant;
   said first vessel including a lid, said lid having a score line therein defining a tear panel and a tab affixed to said lid such that upon lifting said tab, said score line is ruptured and said tear panel is bent into said first vessel;
   said second vessel containing a pressurized refrigerant and said heat exchange unit including a closed valve member for releasing said refrigerant from said second vessel and an actuator for opening said valve member;

said second vessel being housed within said first vessel and being operatively positioned within said first vessel with respect to said tear panel such that said actuator is contacted by said tear panel when said tear panel is bent into said first vessel and said refrigerant is released from said second vessel.

2. The container of claim 1 wherein said second vessel is mechanically independent of said first vessel such that said second vessel can be readily inserted into said first vessel when said first vessel is filled with a food or beverage.

3. The container of claim 2 wherein said first vessel and said second vessel are generally cylindrical.

4. The container of claim 3 wherein said actuator includes a stem having a passageway running axially therethrough, said stem having a first portion adjacent said lid and a second portion directed inwardly of said vessel towards said refrigerant, said first portion having a contact element thereon for contacting with said tear panel, said stem having at least one radially extending opening in said first portion opening on said axial passageway; and said valve member including an element which blocks said radially extending opening such that fluid is prevented from passing into said opening;

whereby upon contacting said contact element with said tear panel, said stem is moved with respect to said valve member such that said radially extending opening is in fluid communication with said refrigerant in said vessel and gaseous refrigerant flows into said opening, through said passageway and is released from said second vessel.

5. The container of claim 4 wherein said second portion of said stem is coaxially housed within a tubular member and said second portion includes a second axial passageway not in fluid communication with said first axial passageway when said valve member is closed;

helical ridges on said second portion of said stem;

a helical space defined between said tubular member and said ridges;

a radially extending opening in said second portion of said stem;

wherein when said valve member is opened, gaseous refrigerant flows into said space and into a helical flow about said stem and a first portion of said refrigerant adjacent the inside surface of said tubular member increases in temperature and moves up said stem and into said radially extending opening in said first portion of said stem and is released from said second vessel and a second portion of said refrigerant flows toward the center of said second portion of said stem and into said radially extending opening in said second portion of said stem and is returned to said second vessel through said second axial passageway.

6. The container of claim 5 wherein said container further includes a positioning member for maintaining the position of said heat exchange unit with respect to said first vessel.

7. The container of claim 5 wherein said element blocking said radially extending opening in said first portion of said stem is an elastomeric ring surrounding said stem.

8. The container of claim 7 wherein said second vessel includes a lid, said lid having a hub therein and said elastomeric ring is retained in said hub such that upon contacting said contact element with said tear panel, said stem moves into said second vessel and refrigerant flows into said radially extending opening in said first portion of said stem.

9. The container of claim 5 wherein said refrigerant condenses as it flows toward the center of said second portion of said stem.

* * * * *